United States Patent [19]

Yesel et al.

[11] Patent Number: 5,553,517
[45] Date of Patent: Sep. 10, 1996

[54] ALL WHEEL DRIVE TORQUE CONTROL LEVER OVERRIDE

[75] Inventors: Leon P. Yesel, East Peoria; John P. Kitzerow, Metamora, both of Ill.

[73] Assignee: Caterpillar Inc., Peoria, Ill.

[21] Appl. No.: 275,858

[22] Filed: Jul. 15, 1994

[51] Int. Cl.$^6$ .................................................. F16H 47/02
[52] U.S. Cl. ........................ 74/731.1; 74/733.1; 180/243
[58] Field of Search ............................... 74/731.1, 732.1, 74/733.1; 180/243

[56] References Cited

U.S. PATENT DOCUMENTS

| | | | |
|---|---|---|---|
| 2,972,906 | 2/1961 | Schroeder | 74/732.1 |
| 3,894,606 | 7/1975 | Hunck et al. | 180/243 |
| 3,951,009 | 4/1976 | Audiffred, Jr. et al. | 74/731.1 |
| 4,444,286 | 4/1984 | Hawkins et al. | 180/243 |
| 4,480,502 | 11/1984 | Nembach | 74/733.1 |
| 5,147,010 | 9/1992 | Olson et al. | 180/243 |
| 5,361,208 | 11/1994 | Olson et al. | 180/243 |

*Primary Examiner*—Charles A. Marmor
*Assistant Examiner*—Sherry Estremsky
*Attorney, Agent, or Firm*—John L. James

[57] ABSTRACT

A torque control lever override of an all wheel drive system matches the front wheel fluid flow, as the wheels are turning, to the flow the pump is generating before the two are connected together. The torque control lever normally controls the pressure and therefore the rim pull delivered to the front wheels. The pump will supply fluid based upon the aggressiveness of the torque control lever which may not always match the current wheel speed. The torque control lever override enhances operation of an all wheel drive system and eliminates excessive harshness when engaging or disengaging the all wheel drive system.

17 Claims, 8 Drawing Sheets

ALL WHEEL DRIVE TORQUE CONTROL LEVER OVERRIDE

TECHNICAL FIELD

The present invention pertains to an all wheel drive machine, and, more particularly, to a method for overriding a torque control lever.

BACKGROUND OF THE INVENTION

Earth moving equipment, such as a motor grader for example, often must operate in environments with poor footing conditions. Some earth moving machines are equipped with an all wheel drive system so that the front wheels of the machine, normally used for steering, are driven to help propel the machine in these poor footing conditions. Normally, only the rear wheels are driven, but when poor footing conditions are encountered causing excessive wheel slip, the front wheels of an all wheel drive machine can be driven to increase traction of the machine thereby reducing slip and maintaining directional control. When all wheels are in poor footing conditions, such as when working on side slopes, or maximum traction is desired, the machine can be operated in an all wheel drive mode. Operating a motor grader in an all wheel drive mode for maximum traction may be desirable when the motor grader is performing a cutting operation, such as cutting a new road or grading a side slope. The all wheel drive mode is also useful when a motor grader is used for removing snow from a roadway.

On a motor grader, a hydraulic pump is used to supply pressurized fluid to pump motors which drive the front wheels in the forward and reverse directions. A torque control lever is used in the all wheel drive mode to control the pressure and therefore the rim pull delivered to the front wheels. On initial engagement of the all wheel drive mode when the machine is moving, the torque control lever can cause the wheels to skid because the pump may not stroke rapidly enough to supply the flow of pressurized fluid required for the current wheel speed. The pump will supply fluid based upon the aggressiveness of the torque control lever which may not always match the current wheel speed. Accordingly, it will be appreciated, that it will be highly desirable to match the front wheel fluid flow, as the wheels are turning, to the flow the pump is generating before the two are connected together without regard to the aggressiveness of the torque control lever.

DISCLOSURE OF THE INVENTION

The present invention is directed to overcoming the problem set forth above. Briefly summarized, according to one aspect of the present invention, a method for overriding a torque control lever in an all wheel drive machine having an engine, transmission and pump for supplying pressurized fluid for effecting all wheel drive, and having automatic and manual modes of operation comprises determining current engine speed; determining whether the inching pedal has just been released; starting a timer when the inching pedal has just been released; determining the mode of operation for a condition wherein the pump pressure is not greater than a preselected value and the timer is greater than a preselected minimum time and less than a preselected maximum time, and for a condition wherein the timer is equal to or less than the preselected minimum time; and setting the torque control lever position to a first lever value when the mode is automatic, the transmission is in first or second gear, the current engine speed is less than a first preselected rpm value and the lever position is greater than the first lever value but using the actual lever position when the lever position is not greater than the first lever value.

According to another aspect of the present invention, an all wheel drive machine having automatic and manual modes of operation comprises an engine, means for determining current engine speed, a transmission, a pump supplying pressurized fluid for effecting all wheel drive, a torque control lever, an inching pedal, means for determining whether the inching pedal has just been released, and means for starting a timer when the inching pedal has just been released. The machine includes means for determining the mode of operation for a condition wherein the pump pressure is not greater than a preselected value and the timer is greater than a preselected minimum time and less than a preselected maximum time, and for a condition wherein the timer is equal to or less than said preselected minimum time; and means for automatically setting the torque control lever position to a first lever value when the mode is automatic, the transmission is in one of first and second gears, the current engine speed is less than a first preselected rpm value and the lever position is greater than said first lever value but using the actual lever position when the lever position is not greater than said first lever value.

The torque control lever normally controls the pressure and therefore the rim pull delivered to the front wheels. The pump will supply fluid based upon the aggressiveness of the torque control lever which may not always match the current wheel speed. The present invention overrides the torque control lever to match the front wheel fluid flow, as the wheels are turning, to the flow the pump is generating before the two are connected together.

These and other aspects, objects, features and advantages of the present invention will be more clearly understood and appreciated from a review of the following detailed description of the preferred embodiments and appended claims, and by reference to the accompanying drawings.

BEST MODE FOR CARRYING OUT THE INVENTION

Figure 1:
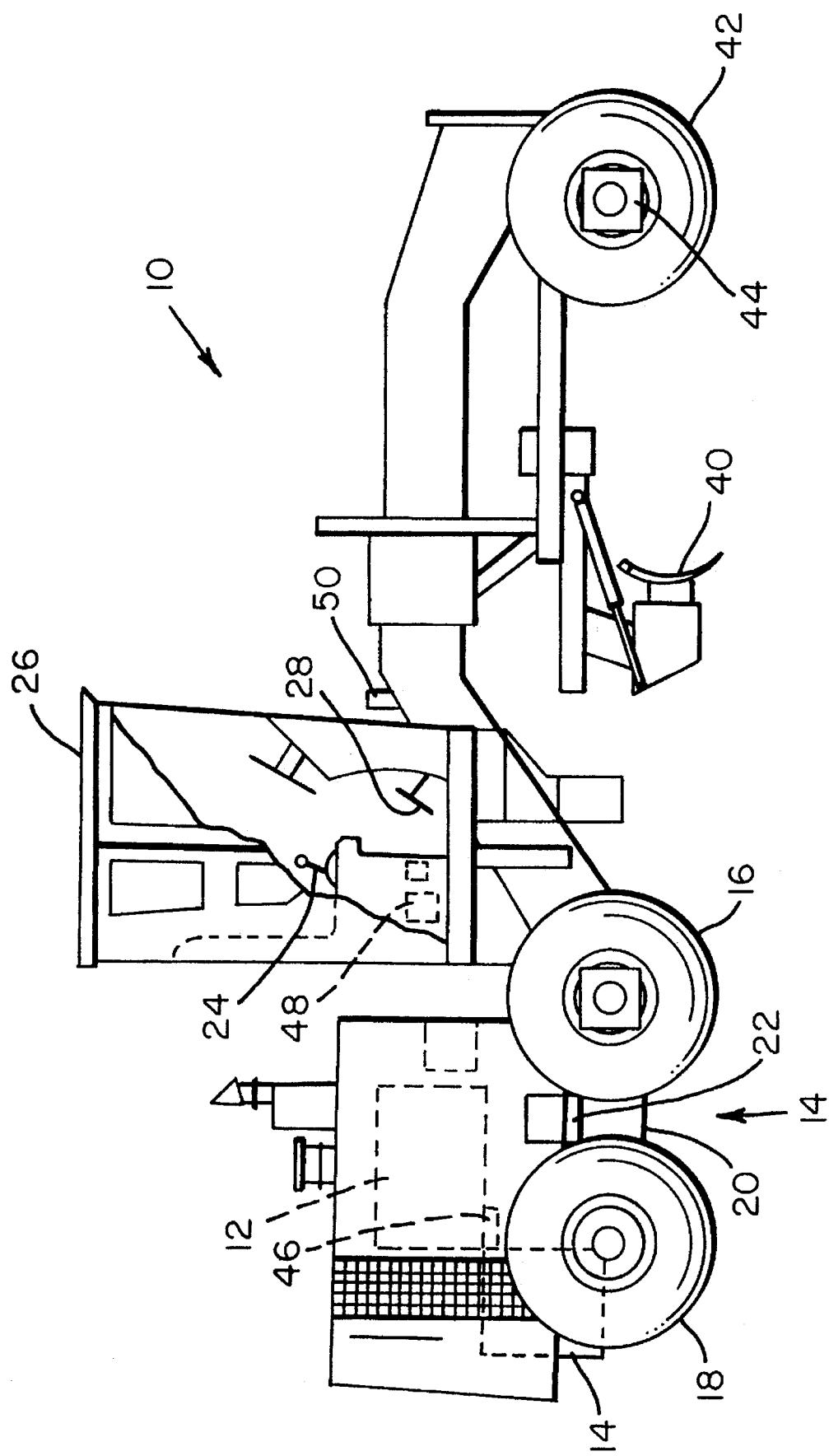
FIG. 1 is a diagrammatic side elevational view of a preferred embodiment of a motor grader constructed for operation in accordance with the present invention.
Figure 2:
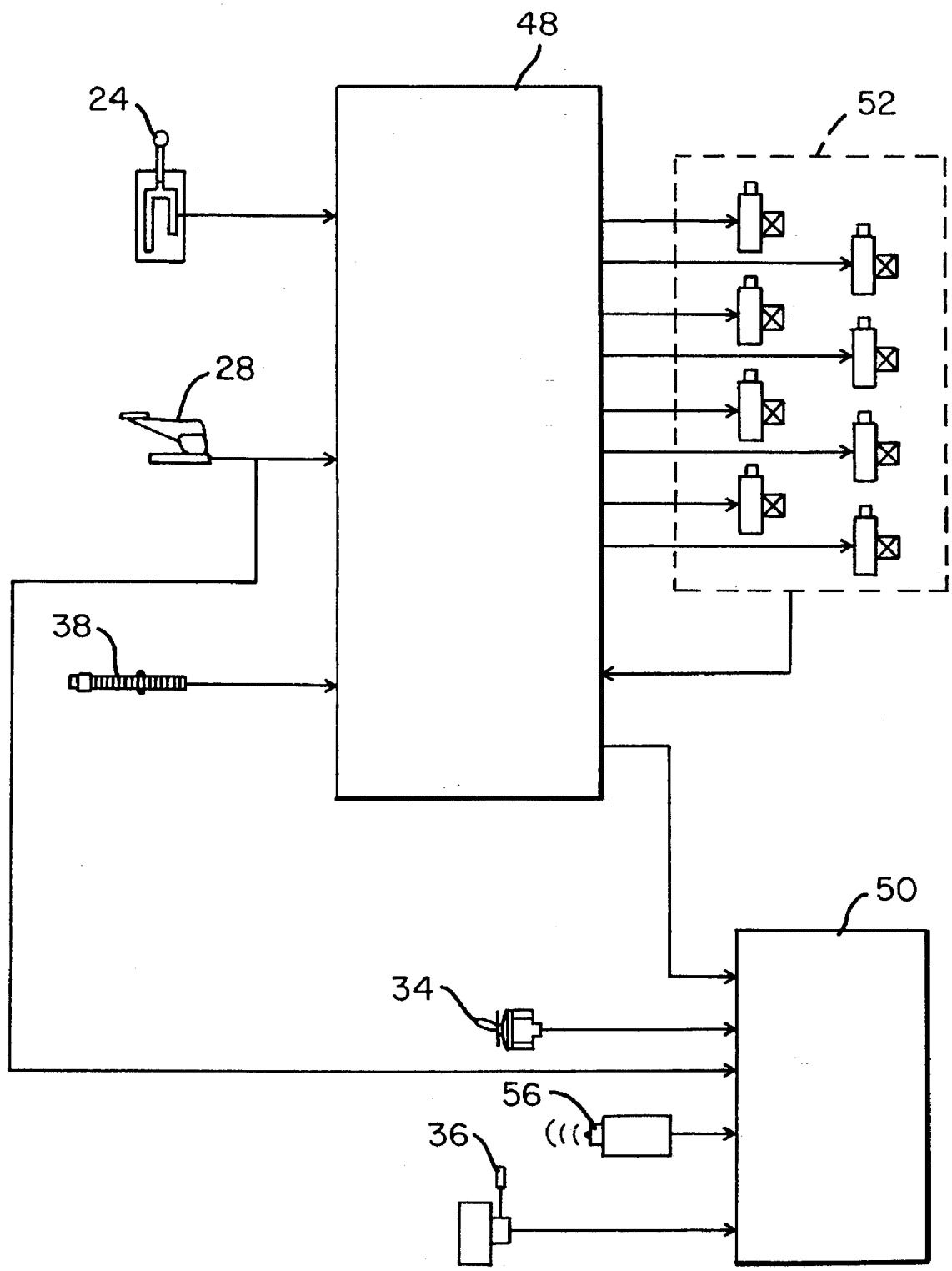
FIG. 2 is a schematic block diagram of the transmission controller of the motor grader of FIG. 1 showing inputs and outputs.

Referring to FIGS. 1 and 2, a motor grader 10 has an engine 12 driving a main drive 14. The main drive 14 includes tandem mounted rear wheels 16, 18 driven by the engine 12 through an electronically controlled and hydraulically actuated transmission 20, and a rear differential 22. The transmission 20 is responsive to a gear shift lever 24 located in an operator's component 26, an all wheel drive switch 34, and a torque control lever 36. The transmission is preferably a countershaft transmission with an output shaft whose rotation is sensed by a transmission output shaft (TOS) sensor 38. The motor grader blade 40 is attached to the frame of the motor grader 10 between the rear wheels 16 and front wheels 42. In the all wheel mode of operation, the front wheels 42 are driven by wheel motors 44 that receive pressurized fluid from a pump 46. Electronic transmission controls 48 are located in the cab 26 under the operator's seat and an electronic all wheel drive controller 50 is located in front of the operator's cab.

The transmission controller 48 receives inputs from the transmission shift lever 24, the inching pedal 28 and the TOS sensor 38. The controller 48 provides outputs to the all wheel drive controller 50 and the transmission solenoids 52 which operate the hydraulic control module 54 to shift the transmission through its eight forward and six reverse gears. The transmission solenoids 52 control the transmission clutches and determine the actual gear in which the transmission operates. Another output from the transmission controller 48 is an input to the all wheel drive controller 50. Other inputs to the all wheel drive controller 50 include an input from the all wheel drive switch 34, the torque control lever 36, and a motor grader ground speed sensor, such as radar ground speed sensor 56. While other methods of determining machine speed may be used, the radar is preferred because it gives an indication of ground speed that is independent of the wheels and therefore is not as susceptible to errors caused by wheel slip.

Figure 3:
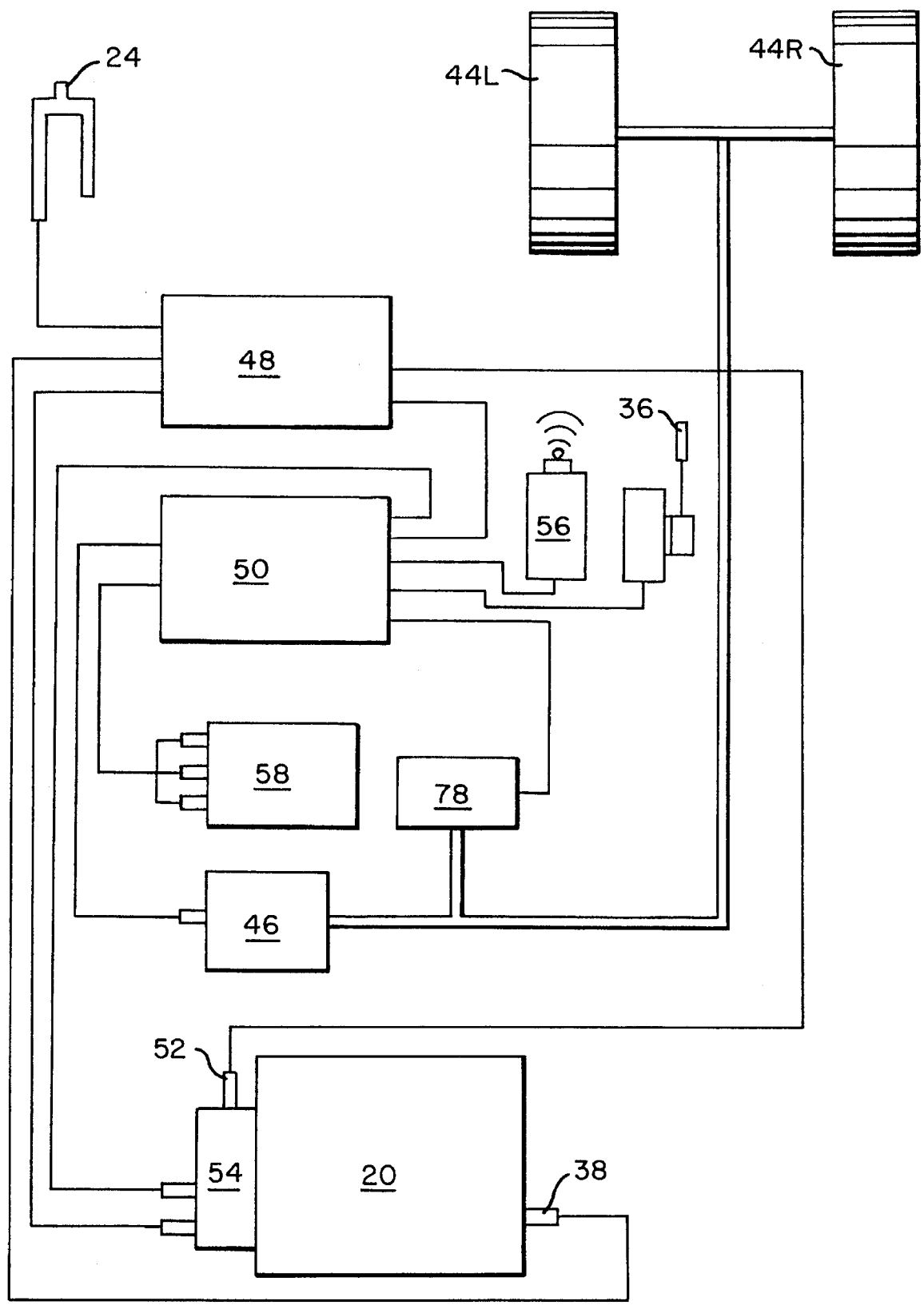
FIG. 3 is a schematic block diagram of the transmission controller and all wheel drive controller of the motor grader of FIG. 1.
Figure 4:
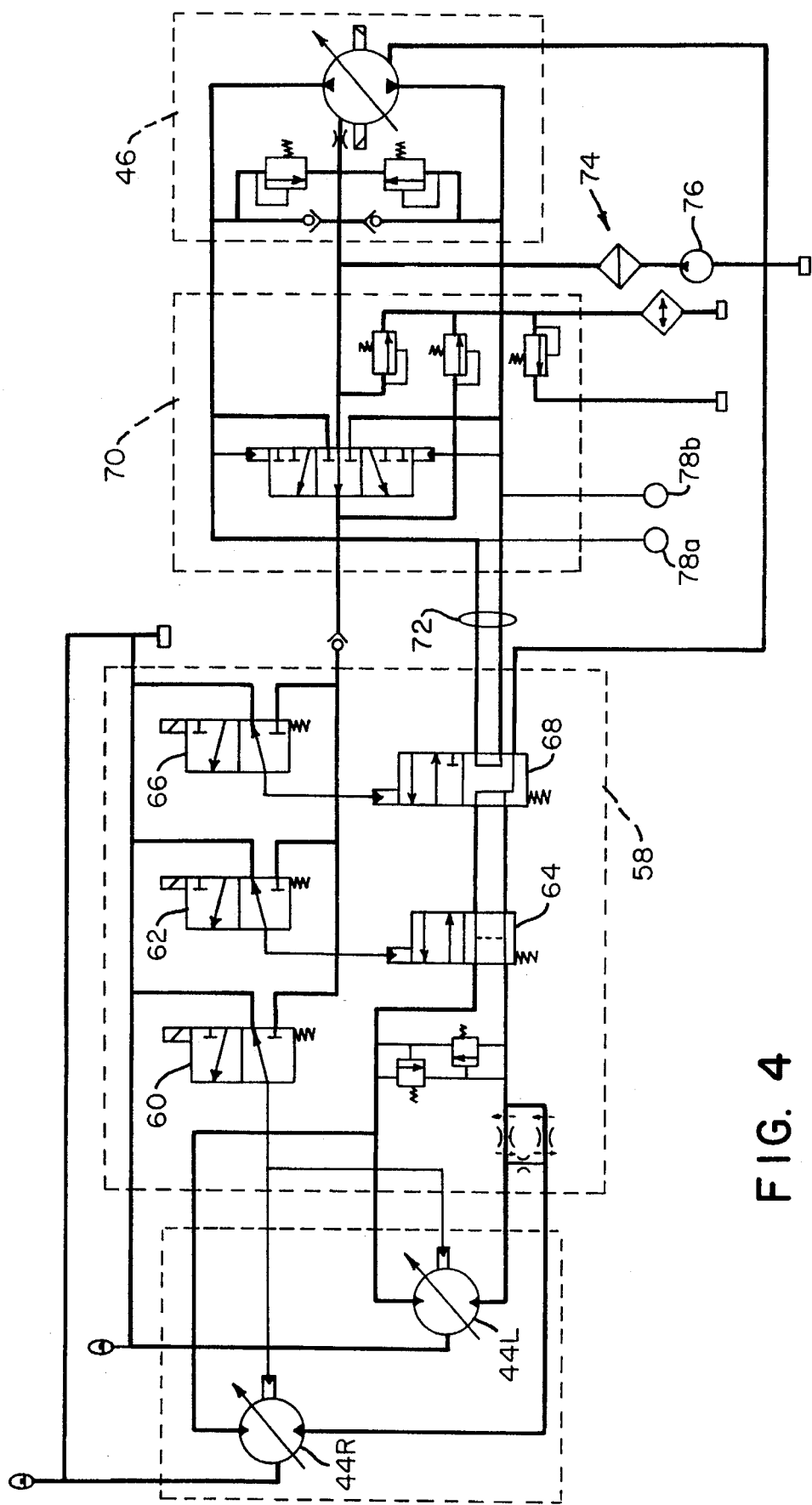
FIG. 4 is a schematic diagram of the hydraulic circuit for the all wheel drive motors of the motor grader of FIG. 1.

Referring now to FIGS. 3 and 4, a control valve 58 is preferably located on the motor grader frame directly above the front axle. The control valve 58 contains a displacement solenoid 60 which controls spool shifting for motor displacement, a freewheel solenoid 62 which controls a freewheel spool 64 for freewheel mode activation, and a charge solenoid 66 which controls a charge spool 68 for charge circuit engagement. The all wheel drive hydraulic system schematic of FIG. 4 shows the wheel motors 44L, 44R, control valve 58, flushing valve 70 and pump 46 that are the primary mechanical system components. Located directly in front of the cab 26 is the flushing valve 70. Its function is to maintain system charge pressure and connect the low pressure side of the drive loop 72, which is determined by the direction of travel, to the charge circuit 74. The charge pump 76 is located under the cab 26 of the motor grader 10 and is preferably mounted on the hydraulic implement pump. It supplies system charge flow and any additional makeup flow required in the drive loop of the all wheel drive system. The all wheel drive system preferably shares the same hydraulic reservoir as the implements.

A convenient location for the pump 46 is on the left-hand side of the motor grader between the differential case and the transmission. The pump is driven off the transmission and supplies the flow requirements to drive the front wheel motors 46. Pressure sensors 78A, 78B are used to monitor pressure in the drive loop 72. When the pump 46 supplies fluid to drive the wheel motors 44 in a forward direction to propel the motor grader in the forward direction, pressure sensor 78A is the high pressure sensor while sensor 78B is the low pressure sensor. Conversely, when pump 46 operates to drive the motor grader in the reverse direction, then pressure sensor 78B is the high pressure sensor while sensor 78A is the low pressure sensor.

Figure 5:
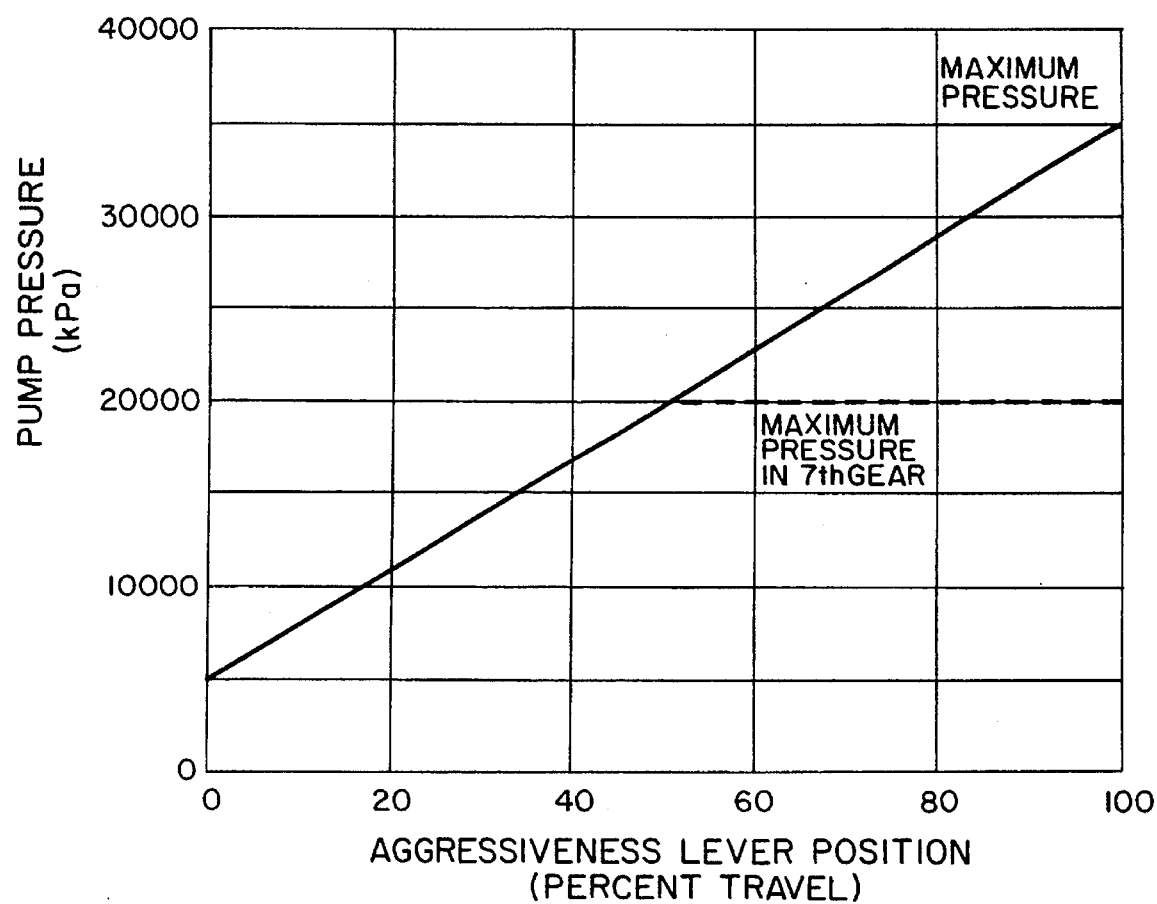
FIG. 5 is a graph illustrating the relation between all wheel drive pump pressure and torque control lever position.
Figure 6:
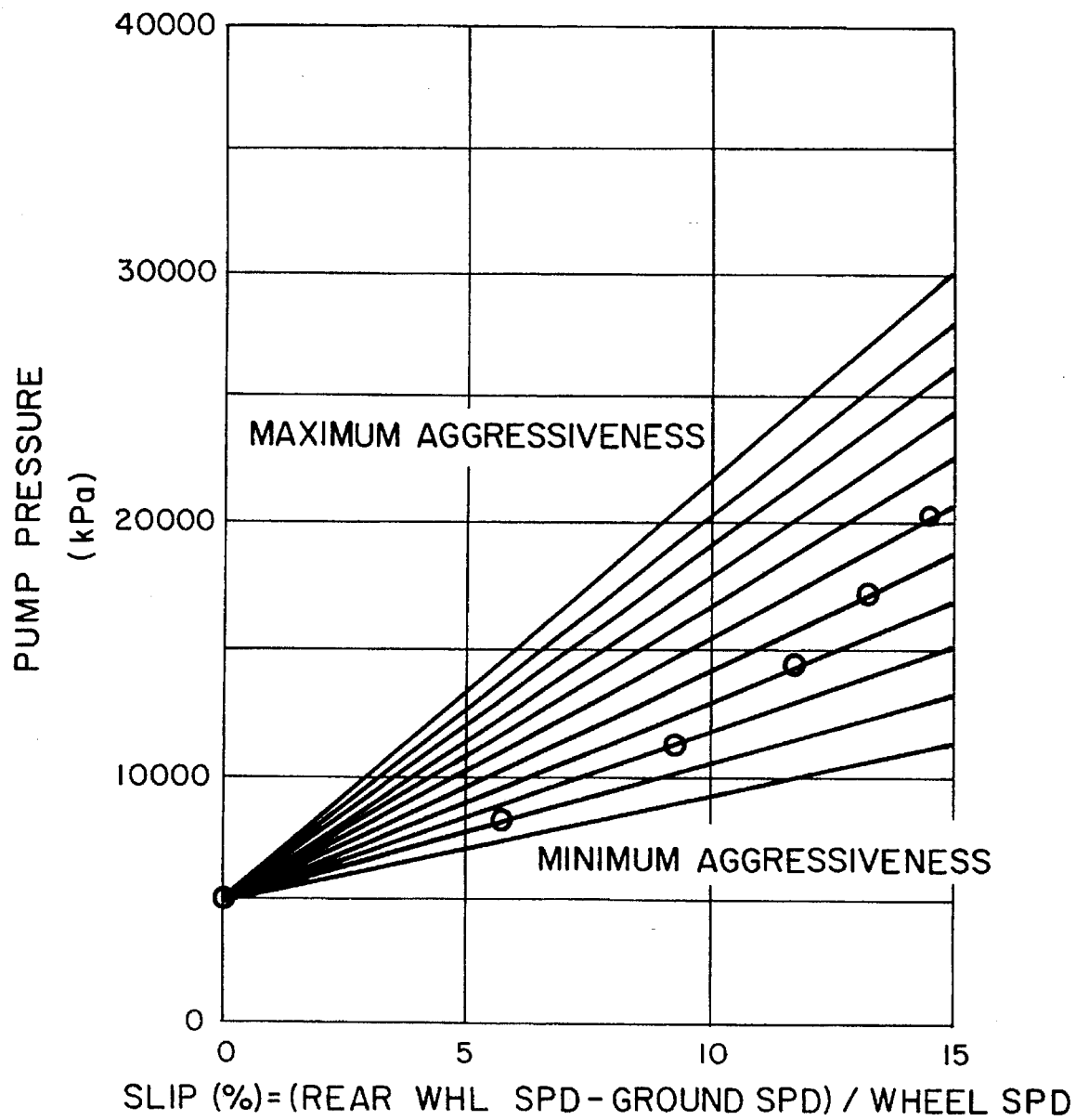
FIG. 6 is a graph illustrating the relationship between all wheel drive pump pressure and wheel slip.

As mentioned, the torque control lever 36 controls the all wheel drive pump 46 pressure. FIGS. 5 and 6 graphically illustrate the relationship of the all wheel drive pump pressure and lever position, and the all wheel drive pump pressure and wheel slip, respectively. In FIG. 5, there is a linear relationship between pump pressure and torque lever aggressiveness. For example, pump pressure increases from about 5,000 kPa at zero lever aggressiveness to about 20,000 kPa at 50% lever aggressiveness which corresponds to the maximum pressure for 7th gear. At 100% lever aggressiveness, the maximum pressure is approximately 35,000 kPa.

FIG. 6 graphically illustrates the relationship between the pump pressure and wheel slip. From a starting point of approximately 0% slip, with percent slip defined as the sum of rear wheel speed minus ground speed divided by rear wheel speed, the pump pressure is approximately 5,000 kPa. As the torque control lever passes through minimum aggressiveness to maximum aggressiveness, the pump pressure increases to about 35,000 kPa.

Figure 7A:
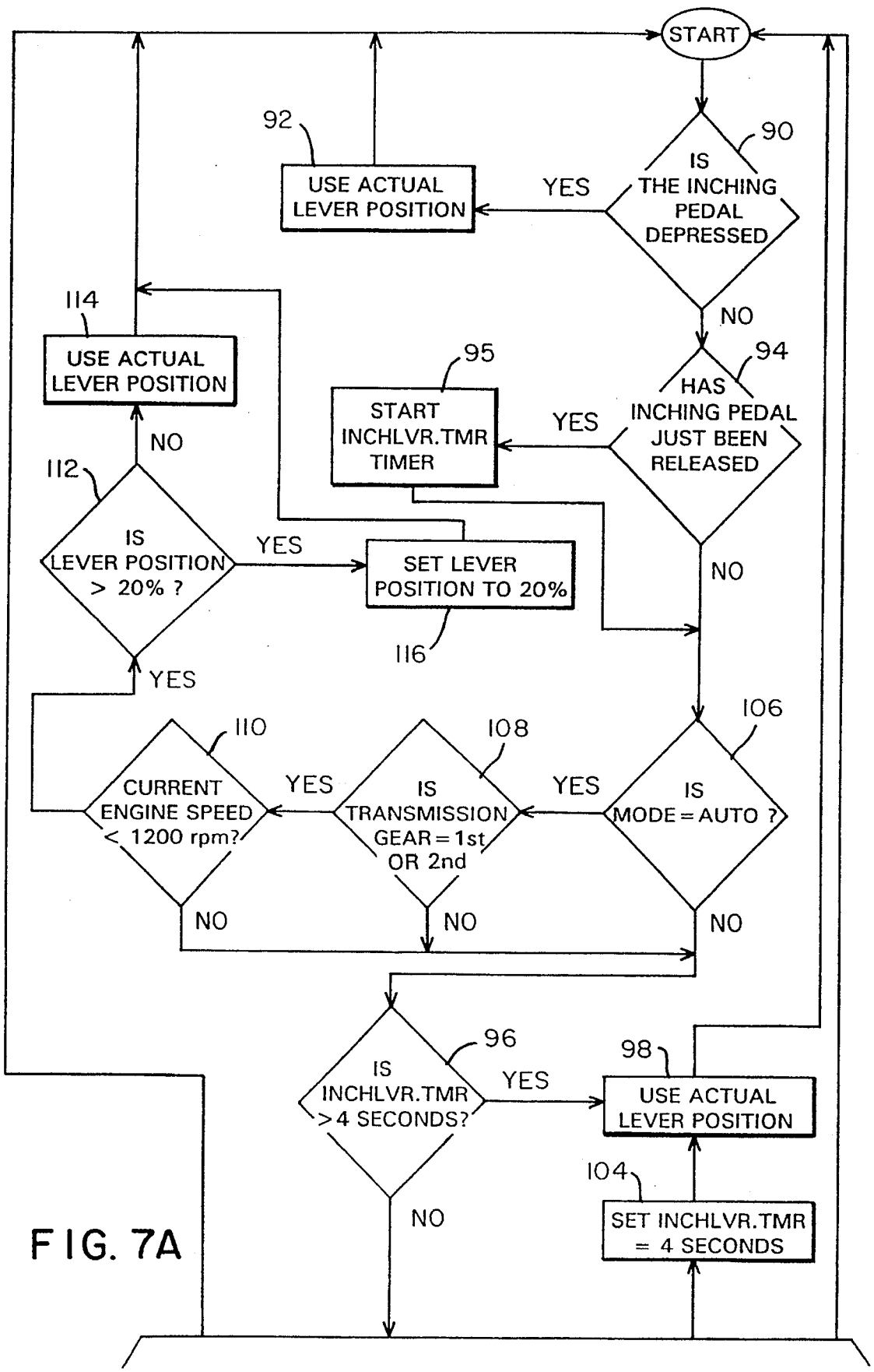
FIGS. 7A and 7B are a flowchart illustrating a method for overriding the torque control lever.
Figure 7B:
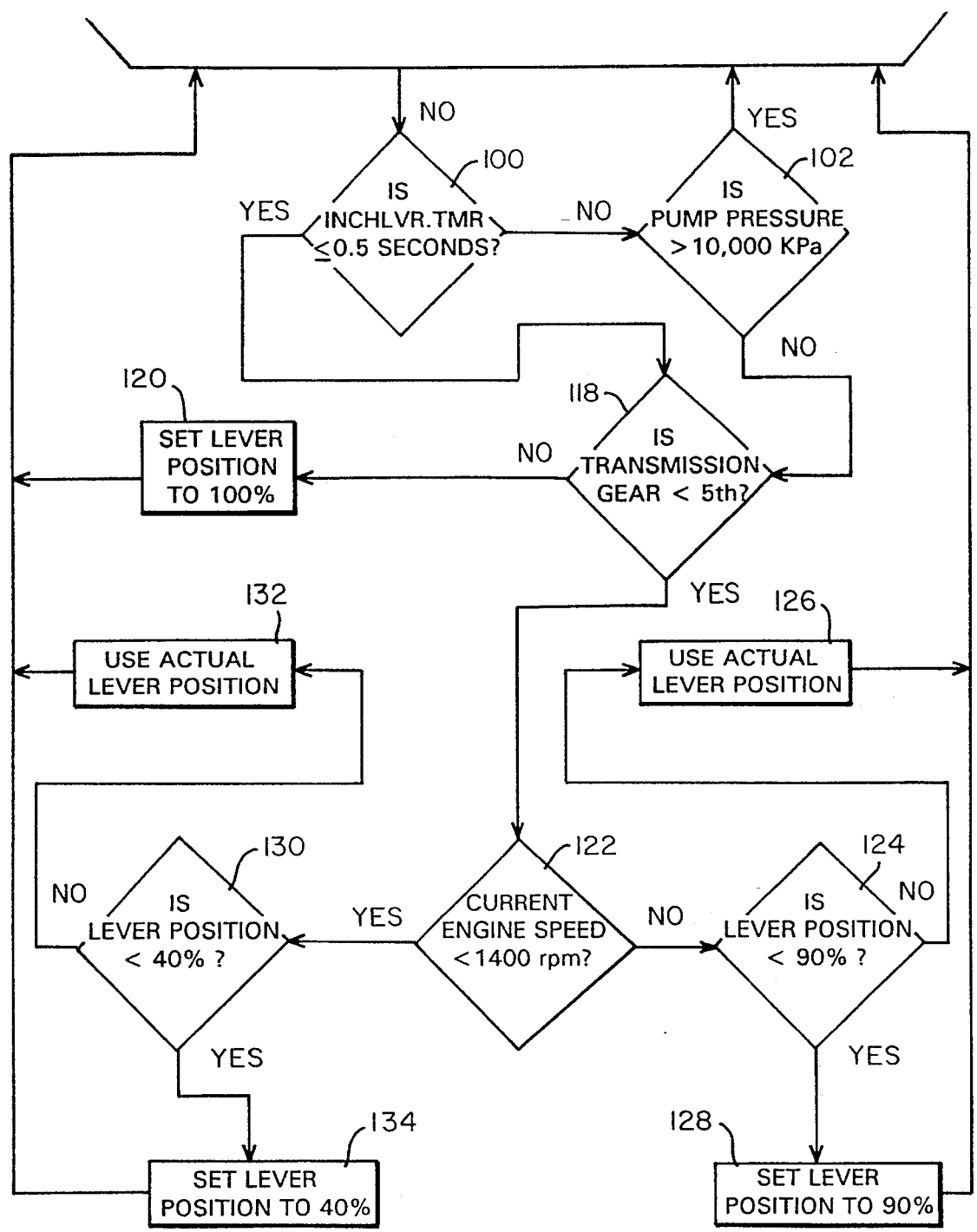

FIGS. 7A and 7B are a flowchart illustrating a method for overriding the torque control lever. The method is started and an inquiry is made, at decision block 90, as to whether the inching pedal is depressed. When the inching pedal is depressed, then at block 92 the actual torque lever position is used and the process restarts.

At block 90, when the inching pedal is not depressed, then at decision block 94, it is determined whether the inching pedal has just been released. If so, then, at block 95, a timer, INCHLVRTMR, is started and the process continues to decision block 106. If, at decision block 94 the answer is no, then the inquiry is made at decision block 106 whether the mode of operation is automatic. If the mode is auto, then at decision block 108, it is determined whether the transmission is in one of first and second gear. If so, then at block 110 it is determined whether current engine speed is less than 1,200 rpm. If so, then at block 112 it is determined whether the lever position is greater than 20%. If not, then at block 114, the actual lever position is used and the process restarts. If so, then at block 116, the lever position is preferably set to 20% and the process restarts.

If, at block 106, the mode is not auto, then the process continues to block 96 where a query is made whether INCHLVRTMR is greater than 4 seconds. The same query is made if, at block 106, the mode is auto but the transmission is not in first or second gear, and the same query if, at block 106, the mode is auto, the transmission is in first or second gear but the current engine speed is not less than 1,200 rpm. If INCHLVRTMR is greater than 4 seconds, then at block 98 the actual lever position is used and the process restarts. If not, then at decision block 100 a query is made as to whether the INCHLVRTMR is equal to or less than 0.5 seconds. If not, then an inquiry is made a decision block 102 as to whether the pump pressure is greater than 10,000 kPa. If so, the method proceeds to block 104 where INCHLVRTMR is set to 4 seconds and the process continues to block 98 where the actual lever position is used. If, at decision block 102, the pump pressure is not greater than 10,000 kPa, the method proceeds to decision block 118, which is the same point the method would reach if the answer at decision block 100 is yes. Thus, if INCHLVRTMR is less than 0.5 seconds or if it is not less than 0.5 seconds but the pump pressure is not greater than 10,000 kPa then, at decision block 118 the query is made whether the transmission is in a gear lower than fifth gear.

If, at decision block 118, the transmission is not in a gear lower than fifth gear, then the lever position is preferably set to 100% at block 120 and the process restarts. If the transmission is in a gear lower than fifth gear, then at decision block 122 it is determined whether the current engine speed is less than 1,400 rpm. If not, then at decision block 124, it is determined whether the lever position is less than 90%. If not, then at block 126, the actual lever position is preferably used and the process restarts. If so, then the lever position is set to 90% at block 128 and the process restarts. While 90% is preferable, the lever position can be set to any value in a range of about 70% to about 90%.

When the current engine speed is less than 1,400 rpm, then at decision block 130 it is determined whether the lever position is less than 40%. If not, then at block 132, the actual lever position is used. On the other hand, if the lever position is less than 40%, then at block 134 the lever position is preferably set to 40% and the process repeats. While 40% is preferable, the lever position can be set to any value in a range of about 30% to about 50%.

The torque control lever override illustrated in the flowchart of FIG. 7 enhances the operation of the all wheel drive system and eliminates excessive harshness when engaging or disengaging the all wheel drive system. Through communication between the motor grader shift lever and the all wheel drive controller, correct all wheel drive motor displacement, desired pump current after shifts, and directional shift change pump current set points, high horsepower engine settings are determined. Three electronic modes of operation of the all wheel drive system are off, on, and free-wheel.

The all wheel drive off mode requires complete piston retraction, pump and control valve solenoids off, and the flushing valve in its neutral position. Two conditions which will cause this mode are (1) the all wheel drive switch is in the off position, and (2) obtaining high gear in forward and reverse.

In the all wheel drive on mode, both the free-wheel and charge solenoids are activated, allowing the pump to provide flow, and thus power, to the front wheel motors.

The free-wheel mode is active when the inching pedal is depressed or the transmission is in neutral. Entering the free-wheel mode results in the free-wheel spool shifting, disconnecting the wheel motors from the pump; however, during this time, the charge solenoid is active keeping the all wheel drive pistons against the cam rings allowing a smooth engagement.

Industrial Applicability

Three nodes of operation are available with the all wheel drive. They are off, manual and automatic. In the off mode, the motor grader operates like a conventional tandem drive machine. The automatic and manual modes provide all wheel drive assistance for increased traction and directional control. In the manual mode, the aggressiveness lever controls the pressure, and, therefore the rim pull, delivered to the front wheels. This pressure can be varied from about 5,500 kPa at the minimum position to about 3,400 kPa at the maximum position. Pressure vs lever position is linear in the manual mode as illustrated by FIG. 5.

Once the all wheel drive is placed in the automatic mode, the front wheel motor pressure is determined by the torque control lever position and percent slip of the rear wheels. Minimum pressure is the same as in the manual mode. A map of the pump pressure versus slip is shown in FIG. 6. It should be noted that the desired pressure cannot exceed maximum pressure.

To fulfill the requirements for both high torque/low speed applications and reduced torque/high speed applications, the all wheel drive motors function at two different displacements. In the forward gears, 1st through 4th, and the reverse gears, 1st through 3rd, the motor uses six pistons to drive the cam ring turning the wheel. This is the high displacement/high torque mode. When gears 5th through 7th forward and 4th and 5th reverse are reached, the motor displacement spool is shifted resulting in the cam ring being driven by four pistons. At the low displacement/reduced torque mode, the motor grader can be operated at the higher snow plowing speed without losing all wheel drive assistance. Because of the flow limitations of the pump, the maximum pressure that can be generated in 7th gear forward or 5th gear reverse is about 19,500 kPa. Therefore, maximum forward speed with the all wheel drive engaged is limited to about 30 kilometers per hour.

The all wheel drive shifts into the off mode with the all wheel drive pistons retracted when reaching 8th forward or 6th reverse gear. Flow requirements cannot be met in these gears with the current BPV70 pump but other, more costly, pumps may be used which can provide the required flow.

As is evident from the foregoing description, certain aspects of the invention are not limited to the particular details of the examples illustrated, and it is therefore contemplated that other modifications and applications will occur to those skilled in the art. For example different pump and motor pressures could be used with different timers. It is accordingly intended that the claims shall cover all such modifications and applications as do not depart from the true spirit and scope of the invention.

What is claimed is:

1. A method for overriding a torque control lever in an all wheel drive machine having an engine, an inching pedal, transmission and pump for supplying pressurized fluid for effecting all wheel drive, said machine having automatic and manual modes of operation, comprising the steps of:

determining current engine speed;

using actual torque control lever position when the inching pedal is depressed to control said pump and thereby control wheel torque;

determining whether the inching pedal has just been released;

starting a timer when the inching pedal has just been released;

determining the mode of operation of said transmission; and overriding the torque control lever and setting the actual torque control lever position to a first lever value to control wheel torque when the mode is automatic, the transmission is in one of first and second gears, the current engine speed is less than a first preselected rpm value and the actual lever position is greater than said first lever value.

2. A method, as set forth in claim 1, wherein said first lever value is about 20 percent.

3. A method, as set forth in claim 1, including overriding the torque control lever and setting the torque control lever position to a second lever value to control wheel torque when the mode is automatic, the transmission is in one of first and second gears, the current engine speed is equal to or greater than said first preselected rpm value but less than a second preselected rpm value, said timer registers a time equal to or less than a preselected minimum time, and the actual lever position is less than said second lever value.

4. A method, as set forth in claim 3, wherein said preselected minimum time is 0.5 seconds.

5. A method, as set forth in claim 3, wherein said second lever value is in a range of about 30 percent to 50 percent.

6. A method, as set forth in claim 1, including overriding the torque control lever and setting the torque control lever position to a second lever value to control wheel torque when the transmission is in a gear lower than fifth gear, the current engine speed is equal to or greater than said first preselected rpm value but less than a second preselected rpm value, said timer registers a time equal to or less than a preselected minimum time, and the actual lever position is less than said second lever value.

7. A method, as set forth in claim 1, including overriding the torque control lever and setting the torque control lever position to a second lever value to control wheel torque when the transmission is in a gear lower than fifth gear, the current engine speed is equal to or greater than said first preselected rpm value but less than a second preselected rpm value, said timer registers a time greater than a preselected minimum time but equal to or less than a preselected maximum time and said pump supplies pressurized fluid at a pressure equal to or less than a preselected pressure.

8. A method, as set forth in claim 7, wherein said preselected maximum time is 4.0 seconds.

9. A method, as set forth in claim 7, wherein said preselected pressure is 10,000 kPa.

10. A method, as set forth in claim 1, including overriding the torque control lever and setting the torque control lever position to a second lever value to control wheel torque when the mode is automatic, the transmission is in one of first and second gears, the current engine speed is equal to or greater than a second preselected rpm value, said timer registers a time equal to or less than a preselected minimum time, and the actual lever position is less than a second lever value.

11. A method, as set forth in claim 10, wherein said second lever value is in a range of about 70 percent to 90 percent.

12. A method, as set forth in claim 1, including overriding the torque control lever and setting the torque control lever position to a second lever value to control wheel torque when the transmission is in a gear lower than fifth gear, the current engine speed is equal to or greater than a second preselected rpm value, said timer registers a time equal to or less than a preselected minimum time, and the actual lever position is less than a second lever value.

13. A method, as set forth in claim 1, including overriding the torque control lever and setting the torque control lever position to a second lever value to control wheel torque when the transmission is in a gear lower than fifth gear, the current engine speed is equal to or greater than a second preselected rpm value, said timer registers a time greater than said preselected minimum time but equal to or less than a preselected maximum time and said pump supplies pressurized fluid at a pressure equal to or less than a preselected pressure and the actual lever position is less than a second lever value.

14. A method, as set forth in claim 1, including overriding the torque control lever and setting the torque control lever position to a second lever value to control wheel torque when the mode is automatic, the transmission is in a gear equal to or greater than fifth gear, and said timer registers a time equal to or less than a preselected minimum time.

15. A method, as set forth in claim 14, wherein said second lever value is about 100 percent.

16. A method for overriding a torque control lever in an all wheel drive machine having an engine, an inching pedal, transmission and pump for supplying pressurized fluid for effecting all wheel drive, said machine having automatic and manual modes of operation, comprising the steps of:

determining whether said inching pedal is depressed;

determining current engine speed and using the actual torque control lever position when the inching pedal is depressed;

determining whether the inching pedal has just been released;

starting a timer when the inching pedal has just been released;

using the actual torque control lever position when the timer exceeds 4 seconds and the mode is not automatic;

overriding the torque control lever and setting the torque control lever position to 20% when the mode is automatic, the transmission is in one of first and second gears, the current engine speed is less than 1200 rpm and the lever position is greater than 20% but using the actual lever position when the lever position is not greater than 20%;

setting the torque control lever position to 100% when the transmission is in fifth gear or higher and the timer is equal to or less than 0.5 seconds;

setting the torque control lever position to 100% when the transmission is in fifth gear or higher, the timer exceeds 0.5 seconds but is equal to or less than 4 seconds, and pump pressure is equal to or less than 10,000 kPa;

setting the torque control lever position to 90% when the current engine speed is not less than 1400 rpm, the transmission is below fifth gear, the timer is equal to or less than 4 seconds, pump pressure is equal to or less than 10,000 kPa, and the torque control lever position is less than 90%; and setting the torque control lever position to 40% when the current engine speed is at least 1200 rpm but less than 1400 rpm, the transmission is below fifth gear, the timer is equal to or less than 4 seconds, pump pressure is equal to or less than 10,000 kPa, and the torque control lever position is less than 40%.

17. An all wheel drive machine having automatic and manual modes of operation, comprising:

an engine;

means for determining current engine speed;

a transmission;

a pump supplying pressurized fluid for effecting all wheel drive;

a torque control lever for controlling wheel torque;

an inching pedal;

means for determining whether the inching pedal has just been released;

means for starting a timer when the inching pedal has just been released;

means for determining the mode of operation of said transmission; and means for automatically setting the torque control lever position to a first lever value when the mode is automatic, the transmission is in one of first and second gears, the current engine speed is less than a first preselected rpm value and the lever position is greater than said first lever value.

* * * * *